(12) United States Patent
Hall et al.

(10) Patent No.: US 7,931,774 B2
(45) Date of Patent: Apr. 26, 2011

(54) ACRYLIC ADHESIVES CONTAINING AN AMINE PLASTICIZER

(75) Inventors: Peter B. Hall, Minneapolis, MN (US); Jingjing Ma, Woodbury, MN (US); Dong-Wei Zhu, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 730 days.

(21) Appl. No.: 11/767,155

(22) Filed: Jun. 22, 2007

(65) Prior Publication Data
US 2008/0115889 A1 May 22, 2008

Related U.S. Application Data

(60) Provisional application No. 60/864,514, filed on Nov. 6, 2006.

(51) Int. Cl.
*B32B 27/00* (2006.01)
*B41J 2/165* (2006.01)
(52) U.S. Cl. ........................................ 156/332; 524/245
(58) Field of Classification Search .................. 156/332; 524/245
See application file for complete search history.

(56) References Cited

U.S. PATENT DOCUMENTS

| 3,865,770 | A | 2/1975 | Blake |
| 4,341,680 | A | 7/1982 | Hauber et al. |
| 4,379,806 | A | 4/1983 | Korpman |
| 4,413,082 | A | 11/1983 | Gleichenhagen et al. |
| 4,418,120 | A | 11/1983 | Kealy et al. |
| 4,548,845 | A | 10/1985 | Parsons et al. |
| 4,569,960 | A | 2/1986 | Blake |
| 5,380,779 | A | 1/1995 | Haese |
| 5,489,642 | A | 2/1996 | Gleichenhagen et al. |
| 5,552,451 | A | 9/1996 | Everaerts et al. |
| 6,103,152 | A | 8/2000 | Gehlsen et al. |
| 6,379,791 | B1 | 4/2002 | Cernohous et al. |
| 6,503,621 | B1 | 1/2003 | Ma et al. |
| 6,677,000 | B2 | 1/2004 | Neuhaus-Steinmetz et al. |
| 2004/0131846 | A1 | 7/2004 | Epple et al. |
| 2004/0229000 | A1 | 11/2004 | Khandpur et al. |

FOREIGN PATENT DOCUMENTS
EP        1489153        12/2004

Primary Examiner — Philip C Tucker
Assistant Examiner — Michael N Orlando

(57) ABSTRACT

Acrylic adhesives containing an acrylic polymer and a plasticizer are provided. The acrylic polymer includes copolymerized monomers of a first alkyl acrylate, a second alkyl acrylate, and a vinyl carboxylic acid. The alkyl group of the first alkyl acrylate has at least 4 carbon atoms, and the alkyl group of the second alkyl acrylate has 1-3 carbon atoms. The plasticizers include a di-ethoxylated tertiary amine segment.

21 Claims, 1 Drawing Sheet

ACRYLIC ADHESIVES CONTAINING AN AMINE PLASTICIZER

CROSS REFERENCE TO RELATED APPLICATION

This application claims the benefit of U.S. Provisional Patent Application No. 60/864,514, filed Nov. 6, 2006, the disclosure of which is incorporated by reference herein in its entirety.

FIELD

The present disclosure provides acrylic adhesives containing an amine plasticizer; particularly, an amine or a diamine plasticizer containing a di-ethoxylated tertiary amine segment.

BACKGROUND

Acrylic adhesives are well-known for use in a wide variety of applications. Generally, an acrylic adhesive contains an acrylic polymer and any of a variety of optional additives. Some acrylic adhesives may be generally suitable for a broad variety of applications, while some acrylic adhesives are specifically formulated to achieve a desired balance of properties, including, e.g., compounding, processing, and end-use properties. There is an on-going need to identify acrylic adhesive formulations suitable for both existing and newly-identified applications.

SUMMARY

Briefly, in one aspect, the present disclosure provides an adhesive comprising an acrylic polymer comprising copolymerized monomers of a first alkyl acrylate, a second alkyl acrylate, a first vinyl carboxylic acid, and a plasticizer comprising a di-ethoxylated tertiary amine segment. The alkyl group of the first alkyl acrylate has at least 4 carbon atoms, and the alkyl group of the second alkyl acrylate has 1-3 carbon atoms. The plasticizer is selected from the group consisting of an amine according to the formula:

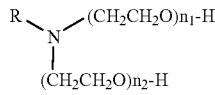

and a diamine according to the formula:

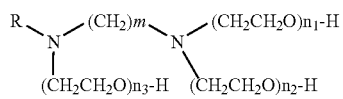

wherein $n_1$, $n_2$, and $n_3$ are independently selected, $n_1$ and $n_2$ are greater than 1, R is an alkyl group, and m is between 1 and 4, inclusive. In some embodiments, the acrylic polymer comprises 30 to 70% of the first alkyl acrylate, 15 to 35% of the second alkyl acrylate, and 15 to 35% of the first vinyl carboxylic acid, by weight.

In some embodiments, the alkyl group of the first alkyl acrylate has 4-8 carbon atoms, and in some embodiments, the first alkyl acrylate is butyl acrylate. In some embodiments, the alkyl group of the second alkyl acrylate has 1-2 carbon atoms. In some embodiments, the first vinyl carboxylic acid is acrylic acid.

In some embodiments, the acrylic polymer further comprises one or more additional copolymerized monomers. In some embodiments, at least one of the additional copolymerized monomers is selected from the group consisting of a monoester of acrylic acid with an alcohol, a monoester of methacrylic acid with an alcohol, acrylamide, N-vinylpyrrolidone, and N-vinylcaprolactam. In some embodiments, at least one of the additional copolymerized monomers is a third alkyl acrylate. In some embodiments, at least one of the additional copolymerized monomers is a second vinyl carboxylic acid.

In some embodiments, $n_1$ and $n_2$ are each less than 20. In some embodiments, the sum of $n_1$ and $n_2$ is between 5 and 15, inclusive. In some embodiments, R is an alkyl group having 10 to 18 carbon atoms.

In some embodiments, the adhesive further comprises a neutralizing agent. In some embodiments, the neutralizing agent comprises an alkaline metal hydroxide, optionally wherein the alkaline metal hydroxide is potassium hydroxide. In some embodiments, at least 10 mole percent of the first vinyl carboxylic acid is neutralized by the neutralizing agent.

In some embodiments, the adhesive further comprises a crosslinker. In some embodiments, the crosslinker comprises polyamide-epichlorohydrin.

In some embodiments, the adhesive is water-dispersible. In some embodiments, the adhesive is a pressure sensitive adhesive. In some embodiments, the adhesive further comprises fibers, optionally wherein the fibers comprise a material selected from the group consisting of rayon, cellulose, and combinations thereof.

In another aspect, the present disclosure provides a tape comprising a backing and a first adhesive layer adhered to a first major surface of the backing. In some embodiments, the tape comprises a second adhesive layer adhered to a second major surface of the backing. In some embodiments, the tape is water-dispersible.

In yet another aspect, the present disclosure provides a method of splicing. In some embodiments, the method of splicing comprises contacting a tape to a first major surface of a first web such that a first portion of the first adhesive layer is bonded to the first major surface of the web; and bonding a second portion of the first adhesive layer to a first major surface of a second web. In some embodiments, the method of splicing comprises contacting a tape to a first major surface of a first web such that at least a portion of the first adhesive layer is bonded to the first major surface of the web, and contacting at least a portion of the second adhesive layer to a first major surface of a second web.

DETAILED DESCRIPTION

Figure 1:
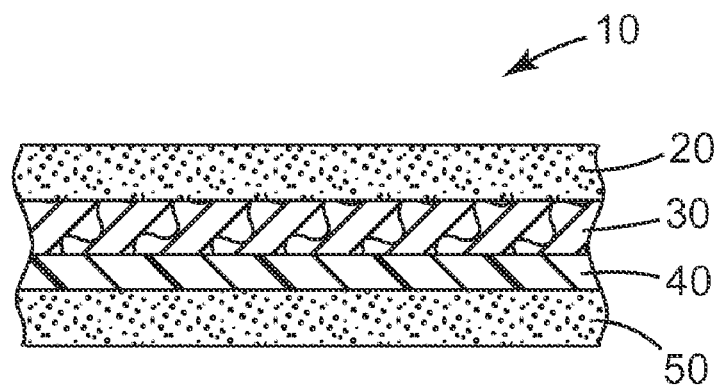
FIG. 1 illustrates an exemplary double-sided adhesive tape according to some embodiments of the present disclosure.

As used herein, the term "water-dispersible" means that the respective composition has a grade of no more than 2 in the "water-dispersibility test," described hereinafter.

Generally, the acrylic adhesives of the present disclosure comprise an acrylic polymer and a plasticizer. In some embodiments, the adhesives comprise a neutralizing agent. In some embodiments, the adhesives comprise a crosslinker. In some embodiments, the adhesives comprise a tackifier. In some embodiments, the adhesives further comprise additional components such as fillers, dyes, pigments, flame-retardants, foaming agents, and the like, which are well-known.

In some embodiments, the acrylic polymers of the present disclosure comprise monomers of a first alkyl acrylate and a second alkyl acrylate copolymerized with vinyl carboxylic acid. The alkyl group of the first alkyl acrylate contains at least 4 carbon atoms, while the alkyl group of the second alkyl acrylate contains 1 to 3 carbon atoms. In some embodiments, one or more additional monomers may be copolymerized with the monomers of the first alkyl acrylate, the second alkyl acrylate, and the vinyl carboxylic acid.

In some embodiments, the alkyl group of the first alkyl acrylate contains 4-8 carbon atoms. Generally, the water-dispersibility of an acrylic polymer may be inhibited by the presence of large amounts of higher molecular weight alkyl acrylates (i.e., alkyl acrylates having an alkyl group containing 8 or more carbon atoms). In some embodiments, an acrylic polymer comprising greater than 80% by weight of an alkyl acrylate having an alkyl group containing 8 or more carbon atoms may not be sufficiently water-dispersible. In some embodiments, an acrylic polymer comprising greater than 70% by weight of an alkyl acrylate having an alkyl group containing 8 or more carbon atoms may not be sufficiently water-dispersible.

In some embodiments, the alkyl group of the first alkyl acrylate contains less than 8 carbon atoms. In some embodiments, the alkyl group of the first alkyl acrylate contains 4-7 carbon atoms, and in some embodiments, 4 or 5 carbon atoms. In some embodiments, the first alkyl acrylate is butyl acrylate.

In some embodiments, the acrylic polymer comprises 30 to 70% by weight of the first alkyl acrylate. In some embodiments, the acrylic polymer comprises at least 40% by weight, or even at least about 45% by weight, of the first alkyl acrylate. In some embodiments, the acrylic polymer comprises no greater than 60% by weight, or even no greater than 55% by weight of the first alkyl acrylate. In some embodiments, the acrylic polymer comprises about 50% by weight of the first alkyl acrylate.

In some embodiments, the alkyl group of the second alkyl acrylate contains 1-2 carbon atoms. In some embodiments, the second alkyl acrylate is methyl acrylate. In some embodiments, the second alkyl acrylate is ethyl acrylate.

In some embodiments, the acrylic polymer comprises 15 to 35% by weight of the second alkyl acrylate. In some embodiments, the acrylic polymer comprises at least 20% by weight of the second alkyl acrylate. In some embodiments, the acrylic polymer comprises no greater than 30% by weight of the second alkyl acrylate. In some embodiments, the acrylic polymer comprises about 25% by weight of the second alkyl acrylate.

Exemplary vinyl carboxylic acids that may be useful in some embodiments of the present disclosure include acrylic acid, methacrylic acid, itaconic acid, maleic acid, fumaric acid, and β-carboxyethylacrylate. Generally, the water-dispersibility of an acrylic polymer may be enhanced by increasing the amount of vinyl carboxylic acid. In some embodiments, an acrylic polymer comprising less than 15% by weight vinyl carboxylic acid may not be sufficiently water-dispersible.

In some embodiments, the acrylic polymer comprises 15 to 35% by weight vinyl carboxylic acid. In some embodiments, the acrylic polymer comprises at least 20% by weight vinyl carboxylic acid. In some embodiments, the acrylic polymer comprises no greater than 30% by weight vinyl carboxylic acid. In some embodiments, the acrylic polymer comprises about 25% by weight vinyl carboxylic acid.

In some embodiments, the acrylic polymer further comprises one or more additional copolymerized monomers. In some embodiments, the acrylic polymer comprises no greater than 25% by weight of one or more additional copolymerized monomers. In some embodiments, the acrylic polymer comprises no greater than 20%, no greater than 15%, no greater than 10%, no greater than 5%, and in some embodiments, no greater than 2%, or even no greater than 1% by weight of one or more additional copolymerized monomers.

In some embodiments, one or more of the additional copolymerized monomers may be a monoester of either acrylic acid or methacrylic acid with an alcohol such as, e.g., ethanol, 1-propanol, 2-propanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylaclohol, 2-ethyl-1-hexanol, ethylene glycol, propylene glycol, and the like. Other exemplary monomers include acrylamide, N-vinylpyrrolidone, and N-vinylcaprolactam.

In some embodiments, at least one of the additional copolymerized monomers is an alkyl acrylate monomer. Exemplary additional acrylate monomers include ethyl acrylate, isooctyl acrylate, and 2-ethyl-hexyl acrylate. In some embodiments, at least one of the additional copolymerized monomers may be a hydroxyalkyl acrylate, e.g., hydroxyethyl acrylate. In some embodiments, one or more of the additional copolymerized monomers may be a vinyl carboxylic acid such as, e.g., methacrylic acid, itaconic acid, maleic acid, fumaric acid, and β-carboxyethylacrylate.

As used herein, the term "plasticizer" refers to a material (e.g., an additive, a compound or an oligomer (low molecular weight polymer)), with a glass transition temperature lower than the acrylic polymer. Generally, a plasticizer imparts tackiness by softening a firm polymer, i.e., by effectively lowering its glass transition temperature (Tg). In some embodiments, the use of a plasticizer results in a better flow and rapid wetting of the substrate to which the plasticized adhesive is applied.

The plasticizers of the present disclosure comprise a di-ethoxylated tertiary amine segment. In some embodiments, the plasticizer is an alkyl, di-ethoxylated, tertiary amine according to the formula:

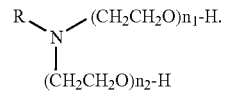

In some embodiments, the plasticizer is a diamine comprising a di-ethoxylated tertiary amine segment, the diamine having the formula:

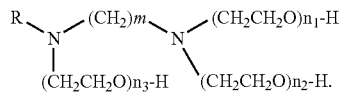

In either case, R is an alkyl group. In some embodiments, R is an alkyl group containing from 10 to 18 carbon atoms, i.e., R is a C10-C18 alkyl group.

Regardless of whether the plasticizer is an amine or a diamine, $n_1$ and $n_2$ independently represent the number of ethylene oxide repeat units in the first and second ethylene oxide branches of the di-ethoxylated tertiary amine segment of the plasticizer. The values of $n_1$ and $n_2$ are greater than 1, and may be independently selected. In some embodiments, both $n_1$ and $n_2$ are less than 20. In some embodiments, the sum of $n_1$ and $n_2$ is between 5 and 15, inclusive.

Generally, the plasticizer as made or as purchased may contain a mixture of amines (or diamines), where the mixture comprises a distribution of ethylene oxide repeat units. In such a case, the average value of both $n_1$ and $n_2$ is greater than 1. In some embodiments, the average value of both $n_1$ and $n_2$ are less than 20. In some embodiments, the sum of the average values of $n_1$ and $n_2$ is between 5 and 15, inclusive.

In the formula for the diamine, $n_3$ independently represents the number of ethylene oxide repeat units in a third ethylene oxide branch of the diamine. Generally, the plasticizer as made or as purchased may contain a mixture of diamines, where the mixture comprises a distribution of ethylene oxide repeat units in the third ethylene oxide branch. In some embodiments, $n_3$ or the average value of $n_3$ is greater than 1. In some embodiments, $n_3$ or the average value of $n_3$ is less than 20. In some embodiments, $n_3$ or the average value of $n_3$ is between 5 and 15, inclusive. In some embodiments, the sum of $n_1$, $n_2$, and $n_3$ is between 5 and 15, inclusive, and, in some embodiments, between 6 and 15, inclusive.

In the formula for the diamine, m represents the number of methylene units in the alkyl group linking the amine segments. In some embodiments, m ranges from 1-4; in some embodiments, m is 2; and in some embodiments, m is 3.

Several neutralizing agents, such as amines and alkali metal hydroxides, can be used for neutralization of the acid groups of the acrylic polymer. In some embodiments, the neutralization not only improves the water-dispersibility of the adhesive, it also increases the cohesive strength of the adhesive composition. In some embodiments, a metal hydroxide (e.g., sodium and/or potassium hydroxide) may be used as a neutralizing agent.

In some embodiments, the cohesive strength of the adhesive can also be adjusted with the addition of crosslinkers (e.g., covalent crosslinkers). Generally, the amount and type of crosslinker is selected to impart cohesiveness up to a point where the water-dispersibility of the adhesive is not affected adversely. The amount of crosslinker that may be added will depend in part on the composition of the acrylic adhesive and the specific crosslinker(s) chosen, and may be determined by routine experimentation.

Any of several well known chemical crosslinking agents may be used. Exemplary crosslinkers include bisamides and polyamide epichlorohydrin compounds. Additional exemplary crosslinking agents include those disclosed in U.S. Pat. No. 4,418,120 (Kealy et al.) and U.S. Pat. No. 4,569,960 (Blake). In some embodiments, it may be desirable to increase internal strength or cohesiveness of the adhesive by crosslinking the acrylic polymer using other conventional methods.

In some embodiments, the adhesives of the present disclosure may comprise a tackifier. As used herein, the word "tackifier" means a compound that is added to the base adhesive polymer to impart or increase the ability of the adhesive to form a bond of measurable strength between two surfaces immediately upon contact of such surfaces with, at most, the application of low pressure at room temperature. Generally, a tackifier has a Tg higher than an acrylic base polymer, and improves the tackiness of the adhesive by increasing the Tg and lowering modulus of the base polymer.

Tackifiers suitable for water-dispersible adhesives include rosin or rosin derivatives, acidic rosin or derivatives, and/or acidic terpenephenolic resins. In some embodiments, the tackifier is a hydrogenated or disproportionated rosin acid or derivatives thereof.

In some embodiments, it may be desirable to minimize or eliminate the use of tackifiers. Rosin-based tackifiers (e.g., FORAL AX and FORAL NC, available from Pinova (a business unit of Hercules, Inc.), Brunswick, Ga.) may be prone to crystallization, which can lead to tack loss during routine storage of the adhesive or of products (e.g., tapes) comprising the adhesive.

In some embodiments, adhesives of the present disclosure may be water-dispersible over a wide range of pH values. In some embodiments, adhesives of the present disclosure may show balanced adhesive properties, including, e.g., peel adhesion, holding power and shear power, as well as acceptable tack/adhesion to paper webs.

Tapes which include the adhesive compositions of the present disclosure may be provided without a backing (e.g., a transfer tape), or with a backing. If a backing is employed, it may be covered with adhesive on one side of the backing (i.e., a single-sided tape) or both sides of the backing (i.e., a double-sided tape).

In some embodiments, one or both adhesive layers may be directly bonded to the backing. In some embodiments, one or both adhesive layers may be indirectly bonded to the backing, e.g., one or more layers may be interposed between the backing and an adhesive layer. In some embodiments, an adhesion-promoting layer may be interposed between the backing an adhesive layer. Generally, any known adhesion promoting layer (e.g., a primer) may be used. In some embodiments, the adhesion promoting layer is water-dispersible under the same conditions as the adhesive.

Referring to FIG. 1, exemplary double-sided adhesive tape 10 according to some embodiments of the present disclosure is shown. Tape 10 includes backing 30 and first adhesive layer 20 adhered to a first major surface of the backing, and second adhesive layer 50 adhered to a second major surface of the backing. First adhesive layer 20 is directly adhered to backing 30. Second adhesive layer 50 is indirectly adhered to the backing, as optional adhesion promoting layer 40 is interposed between backing 30 and second adhesive layer 50.

At least one of first adhesive layer 20 or second adhesive layer 50 comprises an acrylic adhesive according to the present disclosure. In some embodiments, both first adhesive layer 20 and second adhesive layer 50 comprise an adhesive according to the present disclosure. In some embodiments, the backing material may comprise or consist of a material which is water-dispersible under the same conditions as the adhesive composition, e.g., paper or other cellulosic materials.

In some embodiments, an adhesive layer may comprise fibers. In some embodiments, the fibers may be water-dispersible under the same conditions as the adhesive composition, e.g., cellulose fibers and/or rayon fibers. In some embodiments, adhesive transfer tapes (e.g., adhesive layers without a backing) comprise fibers.

In some embodiments, tapes of the present disclosure may be suitable for splicing two webs together, e.g., webs of a water-dispersible material (e.g., paper). In some embodiments, tapes of the present disclosure may be suitable for butt splicing. In some embodiments, tapes of the present disclosure may be suitable for overlap splices.

Figure 2:
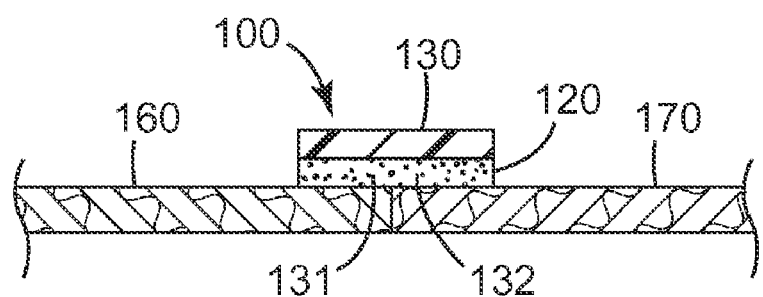
FIG. 2 illustrates an exemplary butt splice according to some embodiments of the present disclosure.

Referring to FIG. 2, an exemplary butt splice according to some embodiments of the present disclosure is shown. Single-sided tape 100 comprises backing 130 and adhesive layer 120. First portion 131 of adhesive layer 120 is adhered to an end of first web 160. Second web 170 is then positioned relative to first web 160 such that second portion 132 of adhesive layer 120 is adhered to an end of second web 170, thereby forming a butt-splice between webs 160 and 170. In some embodiments, a second tape may be applied to the opposite side of first web 160 and second web 170 in the region of the butt splice for additional reinforcement.

Figure 3:
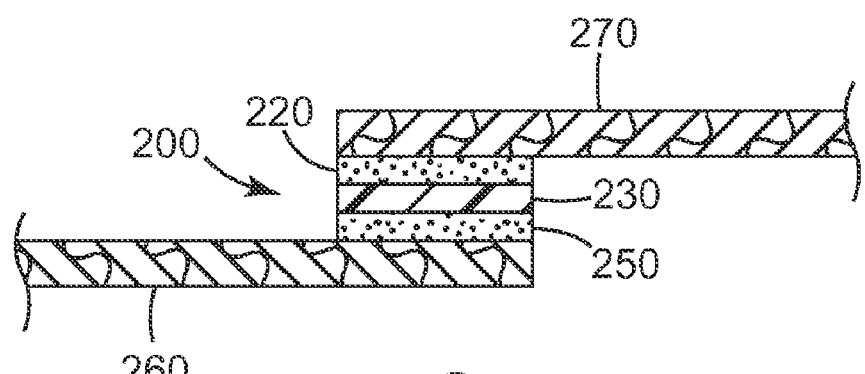
FIG. 3 illustrates an exemplary overlap splice according to some embodiments of the present disclosure.

Referring to FIG. 3, an exemplary overlap splice according to some embodiments of the present disclosure is shown. Double-sided tape 200 comprises backing 230, first adhesive layer 220, and second adhesive layer 230 adhered to opposite sides of backing 230. First adhesive layer 220 is adhered to first web 270 and second adhesive layer 250 is adhered to second web 260, thereby forming an overlap splice between first web 270 and second web 260.

In another aspect, the present disclosure provides methods for forming splices using embodiments of the tapes of the present disclosure. For example, in one embodiment, a butt splice may be formed using a single-sided tape comprising a backing having an adhesive layer on one major surface of the backing. A splice may be formed by contacting the adhesive layer of the tape to a first major surface of a first web such that a first portion the adhesive layer is bonded to the first major surface of the web. The butt splice may then be completed by bonding a second portion of the adhesive layer to a first major surface of a second web.

In another embodiment, an overlap splice may be formed using a double-sided tape comprising a backing having a first adhesive layer and a second adhesive layer on opposite sides of the backing. A splice may be formed by contacting the first adhesive layer of the tape with a first major surface of a first web such that at least a portion of the first adhesive layer is bonded to the first major surface of the web. The overlap splice may be completed by contacting at least a portion of a second adhesive layer to a first major surface of a second web.

In some embodiments, a transfer tape may be used in place of the double-sided tape. A splice may be formed by contacting a first major surface of the transfer tape with a first major surface of a first web. The splice may then be completed by contacting the second major surface of the transfer tape with a first major surface of a second web.

In some embodiments, the first web comprises paper. In some embodiments, the second web comprises paper.

The following specific, but non-limiting, examples will serve to illustrate the invention. In these examples, all percentages are parts by weight unless otherwise indicated.

The following conditioning procedures were employed during the evaluation of the tape samples described in the examples. Procedure A (Room Temperature): the tape sample was held for at least 30 minutes at 70° F. (21° C.) and 50% relative humidity (RH), followed by testing at the same conditions. Procedure B (Hot/Humid): the tape sample was held for 4 hours at 90° F. (32° C.) and 90% RH, followed by placement in a sealed plastic bag and transferred to a room at 21° C. and 50% RH where it was allowed to equilibrate to room temperature. The tape sample was then removed from the sealed bag and tested at 21° C. and 50% RH. Procedure C (Cold): the tape sample was held for 30 minutes at 40° F. (4.4° C.) and then tested at that temperature.

The "Splice Adhesion Strength" of a tape sample used to prepare a web splice was measured in the following manner, which is generally in accordance with the test method described in Pressure Sensitive Tape Council PSTC-131 (Rev 10/03) "Tensile Strength and Elongation of Pressure Sensitive Tapes."

After conditioning according to procedure A or C described above, a sample of a single coated pressure sensitive tape measuring 5 centimeters (cm) long by 2.5 cm wide was used to prepare a lengthwise butt splice between two paper strips (S20 White Copy Bond, 79 grams/square meter (gsm), available from Georgia Pacific, Camas, Wash.) measuring 20 cm long by 2.5 cm wide, with equal portions of the tape on each piece of paper. Each paper strip was separately reinforced by covering its entire backside with a piece of SCOTCH Filament Tape 893 (a single coated, pressure sensitive adhesive filament tape, available from 3M Company, St. Paul, Minn.). The spliced article was rolled down using a mechanical rolldown unit (Poweroll PR-100, obtained from Instrumentors, Incorporated, Strongsville, Ohio), having a 6.8 kilogram (kg) rubber roller, at a rate of 30.5 centimeters/minute (cm/min.) to ensure intimate and consistent contact.

The spliced article was then immediately placed in the jaws of a tensile tester (Instron Universal Materials Testing Machine, Model 4465, Instron Corporation, Norwood, Mass.) and the splice adhesion was measured using the following parameters. The initial distance between jaws was 12.7 cm with no slack in the sample, the rate of jaw separation was 1.25 cm/min., and the load cell capacity was 91 kg (200 pounds). The breaking force was recorded. Three samples were evaluated and the average splice adhesion strength was reported in units of kilonewtons per meter (kN/M).

The "90° Angle Peel Adhesion Strength" of a tape sample to paper was measured in the following manner, which is generally in accordance with the test method described in Pressure Sensitive Tape Council PSTC-101 Method F (Rev 10/03) "Peel Adhesion of Pressure Sensitive Tape."

The surface of a stainless steel test panel measuring 12.5 cm long by 5 cm wide was covered with a piece of 3M FLEXMOUNT Plate Mounting Tape 411DL (a double coated pressure sensitive adhesive tape, available from 3M Company, St. Paul, Minn.) which was trimmed to the same dimensions. Next, a piece of the paper (S20 White Copy Bond) was applied to the exposed tape covering its entire surface and then trimmed to the same dimensions. A 3M PA-1 Tape Wiper (available from 3M Company, St. Paul, Minn.) was used to press down the paper to the tape and the tape to the panel simultaneously using firm hand pressure. After conditioning according to procedure A, B or C described above, a sample of a single coated pressure sensitive adhesive tape measuring 30 cm long by 2.5 cm wide was folded onto itself (adhesive to adhesive) at one end to form a 1.2 cm long tab. The other end of the tape sample was placed flush with the one end of the test panel and in contact with the exposed paper surface. The tape sample was then rolled down using a mechanical rolldown unit adapted to have a 100 gram rubber roller, at a rate of 61 cm/min. The resulting test panel was then placed in a 90° angle test fixture on a peel adhesion tester (Slip/Peel Tester, Model 3M90, obtained from Instrumentors, Incorporated, Strongsville, Ohio). The tab end of the tape sample was secured in the clamps of the adhesion tester and the peel adhesion was measured at a peel rate of 30.5 cm/min. Multiple test panels were evaluated and the average peel force in newtons per meter (N/m) was reported.

The "Holding Power" of a tape sample, adhered to paper, under a constant stress was measured using a 90° angle peel adhesion test in the following manner, which is generally in accordance with the test method described in Pressure Sensitive Tape Council PSTC-14 Rev 10/03) "Adhesion of Pressure Sensitive Tapes To Fiberboard at 90° Angle and Constant Stress."

The surface of a stainless steel test panel measuring 10.2 cm long by 7.6 cm wide was covered with a piece of 3M FLEXMOUNT Plate Mounting Tape 41 DL, which was trimmed to the same dimensions. Next, a piece of the paper (S20 White Copy Bond) was applied to the exposed tape covering its entire surface and then trimmed to the same dimensions. A 3M PA-1 Tape Wiper was used to press down the paper to the tape and the tape to the panel simultaneously using firm hand pressure. A 0.6 cm wide piece of Polyester Silicone Adhesive Tape 8402 (3M Company, St. Paul, Minn.) was placed across the width of one end of the exposed paper surface and rubbed down using finger pressure to serve as a cover tape (this permits initiation of the test without delamination of the paper). After conditioning according to procedure A, B or C described above, a sample of single coated pressure sensitive adhesive tape measuring 25.4 cm long by 2.5 cm wide was placed flush with the other end of the test panel and in lengthwise contact with the exposed paper surface. The tape sample was then rolled down twice in each direction using a mechanical rolldown unit having a 2 kg rubber roller, at a rate of 61 cm/min. to ensure intimate and consistent contact. This resulted in a 15.2 cm portion of the tape extending beyond the end of the plate having the cover tape. This excess was wrapped around a metal hook and back onto itself, and then stapled together. The resulting test panel was then placed in a horizontal test fixture such that the free end of the tape with hook hung down at an angle of 900 from the test panel. A 0.175 kg weight was then attached to the metal hook. The length of time required for the tape sample to peel from the paper (a distance of 9.5 cm) was recorded. Three samples were evaluated and the average holding power in minutes was reported. In some cases, the test was terminated after 2800 minutes.

The "Shear Time," a measure of the ability of a pressure sensitive adhesive tape to remain adhered to a substrate while under a constant load applied in a direction parallel to the surface of the tape and substrate, was evaluated in the following manner, which is generally in accordance with the test method described in Pressure Sensitive Tape Council PSTC-107 Rev 10/03) "Shear Adhesion of Pressure Sensitive Tape," Procedure B. The surface of a stainless steel test panel measuring 10.2 cm long by 7.6 cm wide was covered with a piece of 3M FLEXMOUNT Plate Mounting Tape 411DL, which was trimmed to the same dimensions. Next, a piece of the paper (S20 White Copy Bond) was applied to the exposed tape covering its entire surface and then trimmed to the same dimensions. A 3M PA-1 Tape Wiper was used to press down the paper to the tape and the tape to the panel simultaneously using firm hand pressure.

After conditioning according to procedure A, a sample of single coated pressure sensitive adhesive tape measuring 15.2 cm long by 2.5 cm wide was placed in lengthwise contact with the exposed paper surface on the test panel such that there was at least a 2.5 cm length of the tape on the panel and sufficient excess tape extending beyond the edge of the panel to form a loop. The tape sample was then rolled down twice in each direction using a mechanical rolldown unit having a 2 kg rubber roller, at a rate of 61 cm/min. to ensure intimate and consistent contact. Next, the tape section on the panel was trimmed to exactly 2.54 cm in length. The excess tape extending beyond the edge of the panel was wrapped around a metal hook and then onto itself, adhesive to adhesive, and secured by stapling to secure the hook and provide the test sample. The test sample was immediately transferred to a fixture and positioned such that panel was disposed at 2° to the vertical with the free end of the tape extended downward at an angle of 178° to the test panel. A one kg weight was placed on the metal hook. The amount of time the sample remained on the test panel was recorded in minutes. Three samples were evaluated and the average shear time in minutes was reported. In some cases, the test was terminated after 2800 minutes.

(A) General Solution Polymer Preparation. Solution polymers were prepared in ethyl acetate at a reaction temperature of 58° C. using VAZO 67 (a thermally activated free radical initiator, obtained from E. I. du Pont de Nemours and Company, Wilmington, Del.). The resulting polymer solution was diluted with methanol and additional ethyl acetate to give a final solvent mixture having approximately 40% (by weight) of methanol. The calculated solids level was 22% (by weight). This was verified by drying a sample at 105° C. for 3 hours to obtain the actual (measured) solids level. The actual value was used to calculate the amount of polymer solution used in the preparation of the coating solution.

(B) General Coating Solution Preparation. The polymer solution prepared by Method (A) was mixed with methanol, amine, and 45% aqueous potassium hydroxide, and 0.6% (based on the combined weight of polymer and amine) antioxidant (IRGANOX 1076, a monofunctional hindered phenolic antioxidant, available from Ciba Specialty Chemicals Corporation, Tarrytown, N.Y.) in the order specified with thorough stirring at room temperature. Sufficient methanol was employed to provide a calculated solids level of 30% by weight for the final coating solution. The amounts of polymer and amine, and the calculated neutralization levels of the acrylic acid by potassium hydroxide are shown in the tables below.

(C) General Tape Preparation. The coating solution from Method (B) was used to prepare a single side coated pressure sensitive adhesive tape in the following manner. Just prior to preparation of the tape, a crosslinking agent (POLYCUP 172, a water soluble, polyamide-epichlorohydrin crosslinking agent, available from Hercules, Incorporated, Naperville, Ill.) was added to the coating solution at room temperature with thorough mixing. The amount of crosslinking agent was based on the combined weight of polymer and amine. The coating solution with crosslinker was then coated by hand onto the non-treated side of a 0.076 mm (0.003 inch) thick, silicone treated backing (CIS SCK RHILEASE, available from Wausau-Mosinee Paper Corporation, Mosinee, Wis.) using a knife-over-bed coating station to provide a target dried adhesive thickness of approximately 0.025 mm (0.001 inches) thick. The coated paper was then dried in an oven at 65.5° C. for 5 minutes to provide a single side coated pressure sensitive adhesive tape.

TABLE 1

Raw material summary.

| Identification | Description | Source |
|---|---|---|
| AA | Acrylic acid | BASF Mount Olive, New Jersey |

TABLE 1-continued

Raw material summary.

| Identification | Description | Source |
|---|---|---|
| BA | Butyl acrylate | BASF |
| EA | Ethyl acrylate | BASF |
| HEA | Hydroxyethyl acrylate | Dow Chem. Co., Midland, Michigan |
| MA | Methyl acrylate | BASF |
| 2-MBA | 2-methylbutyl acrylate | 3M Company, St. Paul, Minnesota |
| ETHOMEEN T/25 ("EM T/25") | polyethyleneoxide (15) tallow alkylamine; $RN[(CH_2CH_2O)_{n_1}H] [(CH_2CH_2O)_{n_2}H]$ | Akzo Nobel Chicago, Illinois |
| ETHODUOMEEN T/25 ("EDM T125") | polyethyleneoxide (15) N-tallow alkyl-1,3-diaminepropane; $RN[(CH_2CH_2O)_{n_3}H]$-$(CH_2)_3$-$N[(CH_2CH_2O)_{n_1,n_2}H]_2$ | Akzo Nobel |
| Diethanolamine ("DEA") | 2,2'-iminoethanol; $(HOCH_2CH_2)_2NH$ | Dow Chem. Co. |
| TETRONIC 704 ("T-704")[a] | tetrafunctional block copolymer produced by the sequential addition of propylene oxide and ethylene oxide to ethylene diamine | BASF Mount Olive, New Jersey |
| Ethylenediamine-N,N,N',N'-tetra-2-propanol ("QUAD") | N,N,N',N'-tetrakis (2-hydroxypropyl)ethylene-diamine | Alfa Aesar, Ward Hill, Massachusetts |
| Methyldiethanol-amine ("MDEA") | N-methyldiethanolamine; $(HOCH_2CH_2)_2NCH_3$ | Dow Chem. Co. South Charleston West Virginia |
| JEFFAMINE ED-600 Polyetheramine ("XTJ-500")[b] | an aliphatic polyether diamine derived from propylene oxide-capped polyethylene oxide | Huntsman Corporation, The Woodlands, Texas |
| JEFFAMINE M-2005 Polyetheramine ("XTJ-507")[c] | an aliphatic polyether monoamine derived from polyethylene oxide-capped polypropylene oxide | Huntsman Corporation |
| Foral AX | hydrogenated rosin resin | Pinova, Brunswick, Georgia |

(a) $[H-(PO)x-(EO)a]_2-N-CH_2CH_2-N-[(PO)b-(EO)y-H]_2$
(b) $H_2N-(CH(CH_3)CH_2O)x-(CH_2CH_2O)y-(CH_2CH(CH_3)O)z-NH_2$, where y = 9, (x + z) = 3.6
(c) $CH_3-(OCH_2CH_2)_6-(OCH_2CH(CH_3))_{29}NH_2$

Examples 1-11

Each of Examples 1-11 uses an acrylic acid containing terpolymer comprising interpolymerized units of both a first alkyl acrylate wherein the alkyl group has 4 or more carbon atoms (i.e., butyl acrylate) and a second alkyl acrylate wherein the alkyl group has 1-3 carbon atoms (i.e., methyl acrylate). The BA:MA:AA weight ratio was 50:25:25 for each of Examples 1-11. The polymers were prepared according to the "General Solution Polymer Preparation." Coating solutions containing the amines were prepared according to the "General Coating Solution Preparation" according to the compositions listed in Table 2. These coating solutions were used to prepare single side coated pressure sensitive adhesive tape samples, according to the "General Tape Preparation."

The tape samples were evaluated for "90° Peel Adhesion," "Splice Adhesion Strength," "Holding Power," and "Shear Time" according to the procedures described herein. The results are presented in Table 3 below. In the following tables, the designation "RT" refers to samples that were subjected to Conditioning Procedure A (Room Temperature). The designation "H/H" refers to samples that were subjected to Conditioning Procedure B (hot/humid). The designation "C" refers to samples that were subjected to Conditioning Procedure C (Cold).

TABLE 2

Composition of Examples 1-11.

| Ex. | Polymer (grams) | Amine | Amine (grams) | Crosslinker (weight %) | Neutralization (% of acid) |
|---|---|---|---|---|---|
| 1 | 38 | EM T/25 | 62 | 1.00 | 35 |
| 2 | 43 | EM T/25 | 57 | 1.25 | 20 |
| 3 | 33 | EM T/25 | 67 | 1.25 | 50 |
| 4 | 43 | EM T/25 | 57 | 1.25 | 50 |
| 5 | 30 | EM T/25 | 70 | 1.00 | 35 |
| 6 | 46 | EM T/25 | 54 | 1.00 | 35 |
| 7 | 38 | EM T/25 | 62 | 1.00 | 9.8 |
| 8 | 38 | EM T/25 | 62 | 1.00 | 60 |
| 9 | 38 | EM T/25 | 62 | 0.58 | 35 |
| 10 | 38 | EM T/25 | 62 | 1.42 | 35 |
| 11 | 38 | EDM T/25 | 62 | 1.00 | 35 |

TABLE 3

Properties of Examples 1-11.

| | | 90° peel Adhesion (N/m) | | Splice Strength (kN/m) | Holding Power (minutes) | Shear Time (minutes) |
|---|---|---|---|---|---|---|
| Ex. | Plasticizer | RT | C | RT | RT | RT |
| 1 | EM T/25 | 164 | 197 | 9.5 | 352 | >2800 |
| 2 | EM T/25 | 151 | 185 | 9.0 | 809 | >2800 |
| 3 | EM T/25 | 155 | 203 | 8.3 | 396 | >2800 |
| 4 | EM T/25 | 136 | 180 | 9.3 | >2800 | >2800 |
| 5 | EM T/25 | 168 | 207 | 5.7 | 91 | 1976 |
| 6 | EM T/25 | 146 | 188 | 9.0 | >2800 | >2800 |
| 7 | EM T/25 | 164 | 197 | 7.7 | 127 | 102 |
| 8 | EM T/25 | 156 | 195 | 9.0 | 1199 | >2800 |
| 9 | EM T/25 | 160 | 187 | 7.9 | 254 | 105 |
| 10 | EM T/25 | 153 | 191 | 9.3 | 708 | >2800 |
| 11 | EDM T/25 | 175 | 197 | 9.6 | 2440 | >2800 |

Comparative Examples 1-10

The polymers of Comparative Examples 1-10 were prepared according to the "General Solution Polymer Preparation." Coating solutions containing the amines were prepared according to the "General Coating Solution Preparation" according to the compositions listed in Table 4. These coating solutions were used to prepare single side coated pressure sensitive adhesive tape samples, according to the "General Tape Preparation."

Examples 1 and 11 use acrylic acid containing terpolymers comprising interpolymerized units of both a first alkyl acrylate wherein the alkyl group has 4 or more carbon atoms (i.e., butyl acrylate) and a second alkyl acrylate wherein the alkyl group has 1-3 carbon atoms (i.e., methyl acrylate). Comparative Examples 1-2 use acrylic acid containing copolymers comprising only the first alkyl acrylate (i.e., wherein the alkyl group has 4 or more carbon atoms (i.e., butyl acrylate)). Comparative Examples 3-4 use acrylic acid containing copolymers comprising only the second alkyl acrylate (i.e., wherein the alkyl group has 1-3 carbon atoms (i.e., ethyl acrylate)). These examples all use an amine (ET T/25) or a diamine (EDM T/25) plasticizer containing a di-ethoxylated tertiary amine segment.

TABLE 4

Compositions of Comparative Examples 1-13.

| Ex. | Polymer (wt. % ratio) | Polymer (grams) | Amine | Amine (grams) | Crosslinker (wt. %) | Neutralization (% of acid) |
|---|---|---|---|---|---|---|
| CE 1 | BA:AA (75:25) | 38 | EM T/25 | 62 | 1.00 | 35 |
| CE 2 | BA:AA (75:25) | 38 | EDM T/25 | 62 | 1.00 | 35 |
| CE 3 | EA:AA (78:22) | 38 | EM T/25 | 62 | 1.00 | 35 |
| CE 4 | EA:AA (78:22) | 38 | EDM T/25 | 62 | 1.00 | 35 |
| CE 5 | BA:MA:AA (50:25:25) | 38 | DEA | 62 | 1.00 | 35 |
| CE 6 | BA:MA:AA (50:25:25) | 38 | MDEA | 62 | 1.00 | 35 |
| CE 7 | BA:MA:AA (50:25:25) | 38 | T-704 | 62 | 1.00 | 35 |
| CE 8 | BA:MA:AA (50:25:25) | 38 | QUAD | 62 | 1.00 | 35 |
| CE 9 | BA:MA:AA (50:25:25) | 38 | XTJ-507 | 62 | 1.00 | 35 |
| CE 10 | BA:MA:AA (50:25:25) | 38 | XTJ-500 | 62 | 1.00 | 35 |
| CE 11 | EA:AA (78:22) | 38 | EM T/25 | 62 | 0 | * |
| CE 12 | EA:AA (78:22) | 38 | EDM T/25 | 62 | 0 | * |
| CE 13 | BA:AA (75:25) | 38 | MDEA and FORAL AX | 62 | 0 | 0 |

* neutralized to a pH of 7 with 0.1 N caustic soda

Examples 1 and 11 and Comparative Examples 1-4 were evaluated for "Splice Adhesion Strength," "Holding Power," and "Shear Time." The results are presented in Table 5 below.

TABLE 5

Properties of Examples 1 and 11 compared to Comparative Examples 1-4.

| | | | Splice Strength (kN/m) | | Holding Power (minutes) | | | Shear Time (minutes) |
|---|---|---|---|---|---|---|---|---|
| Ex. | Polymer | Plasticizer | RT | H/H | RT | H/H | C | RT |
| 1 | BA:MA:AA | EM T/25 | 9.5 | 6.8 | 352 | 523 | 239 | >2800 |
| CE 1 | BA:AA | EM T/25 | 7.7 | 6.1 | 488 | 1143 | 281 | >2800 |
| CE 3 | EA:AA | EM T/25 | 0.35 | N.D. | 1 | N.D. | N.D. | 1 |
| 11 | BA:MA:AA | EDM T/25 | 9.6 | 5.6 | 2440 | 1425 | 605 | >2800 |
| CE 2 | BA:AA | EDM T/25 | 8.6 | 6.3 | 672 | 1095 | 285 | >2800 |
| CE 4 | EA:AA | EDM T/25 | 0.35 | N.D. | 2 | N.D. | N.D. | 1 |

Examples 1 and 11 use an amine (ET T/25) or a diamine (EDM T/25) plasticizer containing a di-ethoxylated tertiary amine segment, according to some embodiments of the present disclosure. Comparative Examples 5-10 use alternative plasticizers. Some characteristics of the particular plasticizer used in each example are summarized in Table 6, including whether the plasticizer is a monoamine ("mono-") or diamine ("di-"); whether ethoxylated amine segment is a "primary," "secondary," or "tertiary" amine; whether the ethoxylated amine is an alkyl amine ("yes" or "no"); and the number of ethylene oxide (EO) repeat units ($n_1$, $n_2$) ("=1" or ">1") in the EO branches of the di-ethoxylated tertiary amine segment. Each of these examples and comparative examples use a BA:MA:AA (50:25:25) terpolymer.

TABLE 6

Description of amine and diamine plasticizers.

| Ex. | Plasticizer | Amine | Di-ethoxylated segment | Ethoxylated amine segment | Number of EO repeat units ($n_1$, $n_2$) |
|---|---|---|---|---|---|
| 1 | EM T/25 | mono- | yes | tertiary | >1 |
| 11 | EDM T/25 | di- | yes | tertiary | >1 |
| CE 5 | DEA | mono- | yes | secondary | 1 |
| CE 6 | MDEA | mono- | yes | tertiary | 1 |
| CE 7 | T-704 | di- | no | tertiary (a) | N/A |
| CE 8 | Quad | di- | yes | tertiary | 1 |
| CE 9 | XTJ-507 | di- | no | primary (b) | N/A |
| CE 10 | XTJ-500 | mono- | no | primary (b) | N/A |

(a) T-704 contains repeat units consisting of both EO and propylene oxide (PO).
(b) XTJ-507 and XTJ-500 contain propylene oxide-capped polyethylene glycol.
N/A = not applicable, as the plasticizer does not contain EO-only branches.

The tape samples were then evaluated for "Splice Adhesion Strength," "90° Angle Peel Adhesion Strength," and "Shear Time." The results are presented in Table 7 below.

TABLE 7

Properties of Examples 1 and 11 compared to Comparative Examples 5-10.

| | | Splice Strength (kN/m) | 90° peel Adhesion (N/m) | | Shear Time (minutes) |
|---|---|---|---|---|---|
| Ex. | Plasticizer | RT | RT | C | RT |
| 1 | EM T/25 | 9.5 | 164 | 197 | >2800 |
| 11 | EDM T/25 | 9.6 | 175 | 197 | >2800 |
| CE 5 | DEA | 6.8 | 99 | 77 | 31 |
| CE 6 | MDEA | 5.3 | 58 | 88 | >2800 |
| CE 7 | T-704 | 7.5 | 99 | 109 | >2800 |
| CE 8 | Quad | 10.3 | 252 | 66 | >2800 |
| CE 9 | XTJ-507 | 8.1 | 77 | 88 | >2800 |
| CE 10 | XTJ-500 | 5.3 | 164 | 131 | 75 |

Comparative Examples 11 and 12

A solution polymer of ethyl acrylate and acrylic acid was prepared as described in the example section of U.S. Pat. No. 4,341,680 using VAZO 67 (a thermally activated free radical initiator, obtained from E. I. DuPont de Nemours and Company, Wilmington, Del.). This was then used to prepare a coating solution as described above in "General Coating Solution Preparation" with the following modification. Instead of employing aqueous potassium hydroxide, the polymer solution was adjusted to a pH of about 7.0 using 1 N caustic soda. The major polymer components and their weight ratio in the coating solutions are shown in Table 4. The coating solutions obtained were used to prepare single side coated pressure sensitive adhesive tape samples, as described above in "General Tape Preparation" with the following modification. The crosslinker was not employed.

Comparative Example 13

A solution polymer of butyl acrylate:acrylic acid was prepared as described above in "General Solution Polymer Preparation" except that VAZO 64 (a thermally activated free radical initiator, obtained from E. I. du Pont de Nemours and Company, Wilmington, Del.) was employed. This was then used to prepare a coating solution as described above in "General Coating Solution Preparation" with the following modifications. Fifty percent of FORAL AX (by weight based on the combined weight of polymer and amine) was used and aqueous potassium hydroxide was not employed. The major polymer components and their weight ratio in the coating solution are shown in Table 4. The coating solution obtained was used to prepare single side coated pressure sensitive adhesive tape samples, as described above in "General Tape Preparation" with the following modification. The crosslinker was not employed.

Comparative Examples 11-13 were evaluated for "Splice Adhesion Strength," "Holding Power," and "Shear Time," all as described in the test methods above. The results are presented in comparison to Examples 1 and 11 in Table 8 below.

TABLE 8

Properties of Examples 1 and 11 compared to Comparative Examples 11-13.

| Ex. | Polymer | Plasticizer | Splice Strength (kN/m) RT | Holding Power (minutes) RT | Shear Time (minutes) RT |
|---|---|---|---|---|---|
| 1 | BA:MA:AA | EM T/25 | 9.5 | 352 | >2800 |
| 11 | BA:MA:AA | EDM T/25 | 9.6 | 2440 | >2800 |
| CE 11 | EA:AA (78:22) | EM T/25 | 0.7 | 3 | 1 |
| CE 12 | EA:AA (78:22) | EDM T/25 | 1.6 | 9 | 2 |
| CE 13 | BA:AA (75:25) | MDEA and FORAL AX | 6.8 | 91 | 68 |

The performance of commercially available splicing tapes can be assessed from a comparison of Examples 1 and 11 with Comparative Examples 14-16.

Comparative Example 14 is Repulpable Flying Splice Tape 906, a light-weight tissue coated on both sides with a high tack, high shear strength, water-dispersible acrylic adhesive having a total thickness without release liner of 0.075 mm (0.003 inches), available from 3M Company, St. Paul, Minn. Comparative Example 15 is TESA 51914, a 0.08 mm (0.0032 inches) thick, double-sided repulpable tape consisting of a non-woven fabric and an acrylic adhesive. Comparative Example 16 is TESA 51917, a 0.10 mm (0.004 inches) thick, double-sided repulpable tape consisting of a tissue backing and an acrylic adhesive. Both TESA 51914 and TESA 51917 are available from TESA Tape, Incorporated, Charlotte, N.C.

Each of these samples is a double-sided tape wherein the adhesive layer on one side of the tape is exposed while the adhesive on the other side of the tape is protected by a release liner. The exposed adhesive surface of the tape was covered with a piece of Kraft paper (grade C-696, available from Wausau-Mosinee Paper Corporation, Mosinee, Wis.) and laminated with firm pressure using a 3M PA-1 Tape Wiper. Next, the release liner was removed to expose the protected adhesive layer, and the tape samples were tested for "Splice Adhesion Strength" and "Holding Power," as previously described. The results obtained with Comparative Examples 14-16 are compared with Examples 1 and 2 in Table 9.

TABLE 9

Properties of Examples 1 and 11 compared to Comparative Examples 14-16.

| Ex. | Polymer | Amine | Splice Strength (kN/m) | | Holding Power (minutes) | | |
|---|---|---|---|---|---|---|---|
| | | | RT | H/H | RT | H/H | C |
| 1 | BA:MA:AA | EM T/25 | 9.5 | 6.8 | 352 | 523 | 239 |
| 11 | BA:MA:AA | EDM T/25 | 9.6 | 6.1 | 2440 | 1425 | 605 |
| CE 14 | Acrylic | N.A. | 5.4 | 3.3 | 126 | 290 | 20 |
| CE 15 | Acrylic | N.A. | 5.3 | 3.9 | 28 | 39 | 45 |
| CE 16 | Acrylic | N.A. | 5.4 | 3.7 | 51 | 720 | 59 |

The "water-dispersibility" of the adhesives and tapes of Examples 1 and 11, and Comparative Examples 1-16 contained in waste paper generated during the commercial paper making process was evaluated using the following "Water-Dispersibility Test" summarized below, which is generally in accordance with the test method described in PTS-RH: 013/90-14 "Testing of Splice Tape: Identification of Redispersibility in Water," October 1990 (obtained from PTS (The Paper Technology Specialists), Munich, Germany).

A sample of the pressure sensitive adhesive tape, 0.3 grams, was combined with 49.7 grams of blotter paper (White Pulp Test, Ahlstrom Grade 2400002, available from Ahistrom Mount Holly Springs, Mount Holly Springs, Pa.). The paper/tape combination was cut into pieces measuring approximately 1 cm by 1 cm square, and transferred to a disintegrator (a British Pulp Evaluation Apparatus, obtained from Mavis Engineering Limited, London, England). The disintegrator was then filled with room temperature tap water to a total volume 2000 milliliters (ml) and run for 10 minutes using a rotor speed of 3000 revolutions per minute (rpm). After completion of the disintegrator cycle, the pulp stock was stirred to assure uniformity and then poured into a sheet mold measuring 200 mm by 200 mm (8 inches by 8 inches) (obtained from Williams Apparatus Company, Watertown, N.Y.) and filled with tap water. The sheet mold had been previously fitted on its bottom with a 100 mesh screen. After stirring the stock to provide a uniform dispersion, the water was drained from the sheet mold and the frame of the sheet mold was opened to expose the deposited fiber mat. Two sheets of blotter paper were placed over the top of the mat and rolled down several times with a rolling pin to absorb water. The blotter paper/fibered mat layup was then turned over and a third piece of dry blotter paper was placed on the exposed bottom mat surface and rolled down to further absorb water from the layup. Next, the layup was separated to expose the top mat surface which was then covered with a fourth piece of dry blotter paper. This article was then placed in a hydraulic press and a pressure of 5.5 kilograms/square centimeter was applied to the article for 30 seconds. The pressed article was removed and placed in a sheet drier (Sheet Drier, obtained from Testing Machines Incorporated, Amityville, N.Y.) until dry (about five minutes).

The dried article was separated to remove the blotter sheets and provide a handsheet. As this was done, any pulling of fibers from the handsheet that was observed was noted. Such fiber pulling is indicative of non-dispersed adhesive. The separated handsheet was examined under a backlight for transparent spots, which are also indicative of non-dispersed adhesive. Four handsheets were prepared and evaluated. The sum results for four handsheets were reported using the following grades:

| Grade | Description |
|---|---|
| 1 | no fiber pull or spots observed |
| 2 | 1-3 spots observed; no fiber pull observed |
| 3 | 4-5 spots observed; no fiber pull observed |
| 4 | more than 5 spots observed; or fiber pull observed |

As used herein, an adhesive or a tape is "water-dispersible" if it receives a grade of 1 or 2 in the water-dispersibility test. Each of Examples 1 and 11, and Comparative Examples 1-16 received a grade of "1" and is, therefore, water-dispersible.

The adhesive of Example 1 and the tape of Comparative Example 13 were evaluated for water-dispersibility over a range of pH. A light-weight tissue was coated on both sides with the adhesive composition described in Example 1 to produce the tape of Example 12. Thus, Example 12 was a double coated tape having an adhesive thickness of about 0.025 mm (0.001 inches) on each side and a total thickness without release liner of 0.075 mm (0.003 inches).

The "water-dispersibility" test described above was repeated over the pH range of 2 to 10. The pH of the water employed during the disintegrator cycle was adjusted using either 0.1N hydrochloric acid or 0.1N sodium hydroxide and then verified using ply test paper. In addition, deionized water was used in place of tap water. The results are shown in Table 10 below.

TABLE 10

Water-dispersibility of Example 12 and Comparative Example 13.

| Ex. | pH | Water Dispersibility Grade |
|---|---|---|
| 12 | 2 | 2 |
| CE 13 | 2 | 4 |
| 12 | 4 | 1 |
| CE 13 | 4 | 1 |
| 12 | 6 | 1 |
| CE 13 | 6 | 1 |
| 12 | 12 | 1 |
| CE 13 | 12 | 1 |

Examples 13-17

Each of Examples 1-11 used terpolymer comprising interpolymerized units of a first alkyl acrylate having 4 carbon atoms (i.e., butyl acrylate), a second alkyl acrylate having 1 carbon atom (i.e., methyl acrylate), and acrylic acid as the vinyl carboxylic acid (i.e., BA:MA:AA) with a weight ratio of 50:25:25. Examples 13-16 use interpolymerized units of alternative first alkyl acrylates, second alkyl acrylates, and/or vinyl carboxylic acids to demonstrate additional exemplary embodiments of the present disclosure. The acrylic polymer compositions are set forth in Table 11.

TABLE 11

Acrylic polymers of Examples 13-17 and as compared to Examples 1-11.

| Ex. | Polymer | First Acrylate (parts) | Second Acrylate (parts) | Vinyl carboxylic acid (parts) | Additional monomer (parts) |
|---|---|---|---|---|---|
| 1-11 | BA:MA:AA | BA (50) | MA (25) | AA (25) | — |
| 13 | BA:MA:MAA | BA (50) | MA (25) | MAA (25) | — |
| 14 | BA:MA:MAA:HEA | BA (45) | MA (25) | MAA (15) | HEA (15) |
| 15 | BA:EA:MAA | BA (50) | EA (25) | AA (25) | — |
| 16 | MBA:MA:AA | MBA (50) | EA (25) | AA (25) | — |
| 17 | 2-EHA:EA:AA | 2-EHA (50) | EA (25) | AA (25) | — |

The polymer of Example 13 precipitated out of solution during preparation. Although not attempted, it is believed that coating solutions could be prepared from acrylic polymers containing the monomers of Example 13 if the monomer weight ratios were varied or, as shown in Example 14, an additional copolymerizable monomer was included.

The acrylic polymers of Examples 14-17 were prepared according to the "General Solution Polymer Preparation." Coating solutions containing an amine were prepared according to the "General Coating Solution Preparation" according to the compositions listed in Table 12. Adhesive compositions prepared using the EM T/25 amine are identified with the letter "A," while adhesive compositions prepared using the EDM T/25 diamine are identified with the letter "B." These coating solutions were used to prepare single side coated pressure sensitive adhesive tape samples, according to the "General Tape Preparation."

TABLE 12

Composition of Examples 14-17.

| Example | Polymer (grams) | Amine | Amine (grams) | Crosslinker (weight %) | Neutralization (% of acid) |
|---|---|---|---|---|---|
| 14-A | 57.1 | EM T/25 | 31 | 1% | 35% |
| 14-B | 57.1 | EDM T/25 | 31 | 1% | 35% |
| 15-A | 97.4 | EM T/25 | 31 | 1% | 35% |
| 15-B | 97.4 | EDM T/25 | 31 | 1% | 35% |
| 16-A | 98.4 | EM T/25 | 31 | 1% | 35% |
| 16-B | 98.4 | EDM T/25 | 31 | 1% | 35% |
| 17-A | 97.4 | EM T/25 | 31 | 1% | 35% |
| 17-B | 97.4 | EDM T/25 | 31 | 1% | 35% |

Each of these examples was tested for "90° Peel Adhesion," "Splice Strength," "Holding Power," "Shear Time," and "Water-Dispersibility" (i.e., "W-D"). The results are reported in Table 13.

TABLE 13

Properties of Examples 14-17.

| Ex. | Plasticizer | 90° peel Adhesion (N/m) RT | Splice Strength (kN/m) C | Holding Power (minutes) RT | Shear Time (minutes) RT | W-D grade |
|---|---|---|---|---|---|---|
| 14-A | EM T/25 | 95 | 96 | 5.7 | 5 | >2800 | 1 |
| 14-B | EDM T/25 | 140 | 136 | 7.2 | 35 | >2800 | 1 |
| 15-A | EM T/25 | 146 | 110 | 8.4 | 336 | 2721 | 1 |
| 15-B | EDM T/25 | 183 | 145 | 8.3 | 411 | 585 | 1 |
| 16-A | EM T/25 | 160 | 114 | 8.8 | 532 | 2208 | 1 |
| 16-B | EDM T/25 | 205 | 170 | 9.4 | 611 | 1164 | 1 |
| 17-A | EM T/25 | 170 | 135 | 7.9 | 277 | 359 | 1 |
| 17-B | EDM T/25 | 225 | 191 | 8.1 | 342 | 528 | 1 |

Various modifications and alterations of this invention will become apparent to those skilled in the art without departing from the scope and spirit of this invention.

What is claimed is:

1. An adhesive comprising:
an acrylic polymer comprising copolymerized monomers of
(a) 30 to 70% by weight of a first alkyl acrylate, wherein the alkyl group of the first alkyl acrylate has at least 4 carbon atoms,
(b) 15 to 35% by weight of a second alkyl acrylate, wherein the alkyl group of the second alkyl acrylate has 1-3 carbon atoms, and
(c) 15 to 35% by weight of a first vinyl carboxylic acid; and
a plasticizer comprising a di-ethoxylated tertiary amine segment, wherein the plasticizer is selected from the group consisting of:
an amine according to the formula:

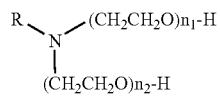

and
a diamine according to the formula:

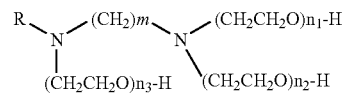

wherein $n_1$, $n_2$, and $n_3$ are independently selected, $n_1$ and $n_2$ are greater than 1, R is an alkyl group, and m is between 1 and 4, inclusive.

2. The adhesive according to claim 1, wherein the alkyl group of the first alkyl acrylate has 4-8 carbon atoms.

3. The adhesive according to claim 2, wherein the alkyl group of the first alkyl acrylate has 4-5 carbon atoms.

4. The adhesive according to claim 1, wherein the alkyl group of the second alkyl acrylate has 1-2 carbon atoms.

5. The adhesive of claim 1, wherein the acrylic polymer comprises copolymerized monomers of the first alkyl acrylate, the second alkyl acrylate, the first vinyl carboxylic acid, and one or more additional copolymerized monomers.

6. The adhesive of claim 5, wherein at least one of the additional copolymerized monomers is selected from the group consisting of a monoester of acrylic acid with an alcohol, a monoester of methacrylic acid with an alcohol, a hydroxyalkyl acrylate, acrylamide, N-vinylpyrrolidone, and N-vinylcaprolactam.

7. The adhesive of claim 5, wherein at least one of the additional copolymerized monomers is a third alkyl acrylate.

8. The adhesive according to claim 1, wherein the first vinyl carboxylic acid is acrylic acid.

9. The adhesive according to claim 1, wherein $n_1$ and $n_2$ are each less than 20.

10. The adhesive of claim 9, wherein the sum of $n_1$ and $n_2$ is between 5 and 15, inclusive.

11. The adhesive according to claim 1, wherein R is an alkyl group having 10 to 18 carbon atoms.

12. The adhesive according to claim 1, wherein the plasticizer comprises the amine according to the formula:

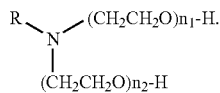

13. The adhesive according to claim 1, wherein the plasticizer comprises the diamine according to the formula:

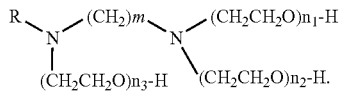

14. The adhesive according claim 13, where in the sum of $n_1$, $n_2$, and $n_3$ is between 5 and 15, inclusive.

15. The adhesive according to claim 1, further comprising a neutralizing agent.

16. The adhesive according to claim 1, further comprising a crosslinker.

17. The adhesive according to claim 1, wherein the adhesive is water-dispersible.

18. A tape comprising a backing and a first adhesive layer adhered to a first major surface of the backing, wherein the first adhesive layer comprises the adhesive of claim 1.

19. The tape according to claim 18, further comprising a second adhesive layer adhered to a second major surface of the backing.

20. A method of splicing comprising:
   (a) contacting the tape according to claim 18 to a first major surface of a first web such that a first portion the first adhesive layer is bonded to the first major surface of the web; and
   (b) bonding a second portion of the first adhesive layer to a first major surface of a second web.

21. A method of splicing comprising:
   (a) contacting the tape according to claim 19 to a first major surface of a first web such that at least a portion of the first adhesive layer is bonded to the first major surface of the web; and
   (b) contacting at least a portion of the second adhesive layer to a first major surface of a second web.

* * * * *

UNITED STATES PATENT AND TRADEMARK OFFICE
CERTIFICATE OF CORRECTION

| | | |
|---|---|---|
| PATENT NO. | : 7,931,774 B2 | Page 1 of 1 |
| APPLICATION NO. | : 11/767155 | |
| DATED | : April 26, 2011 | |
| INVENTOR(S) | : Peter B. Hall et al. | |

It is certified that error appears in the above-identified patent and that said Letters Patent is hereby corrected as shown below:

<u>Column 4</u>
Lines 24-25, delete "isooctylaclohol," and insert in place thereof
-- isooctylalcohol --.

Line 37, delete "P" and insert in place thereof -- β --.

<u>Column 9</u>
Line 6, delete "41 DL," and insert in place thereof -- 411 DL, --.

Line 30 (approx.), delete "of 900" and insert in place thereof -- of 90° --.

<u>Column 17</u>
Line 32, delete "Ahistrom" and insert in place thereof -- Ahlstrom --.

<u>Column 18</u>
Line 35, delete "ply" and insert in place thereof -- pH --.

<u>Column 22</u>
Line 1, In Claim 14, after "according" insert in place thereof -- to --.

Line 1, In Claim 14, delete "where in" and insert in place thereof -- wherein --.

Signed and Sealed this
Twenty-second Day of November, 2011

David J. Kappos
*Director of the United States Patent and Trademark Office*